Aug. 17, 1948.  V. E. C. MARTIN ET AL  2,447,077
CANNED FOOD HEATING DEVICE
Filed Oct. 7, 1946
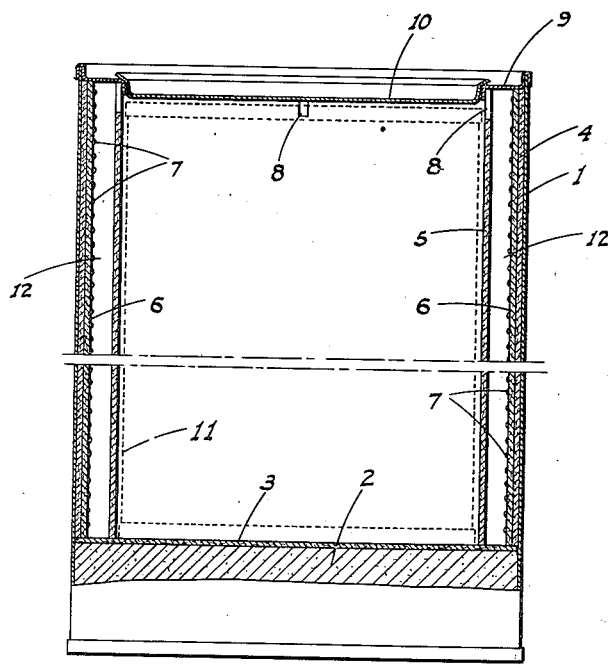
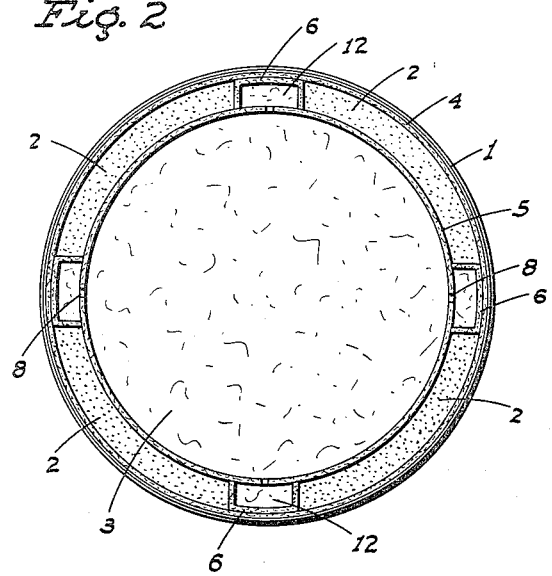
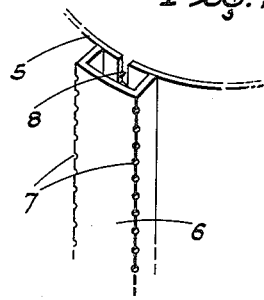
INVENTORS
Virgil E. C. Martin
Donald E. Martin
BY
ATTYS Patented Aug. 17, 1948

2,447,077

UNITED STATES PATENT OFFICE 2,447,077

CANNED FOOD HEATING DEVICE

Virgil E. C. Martin and Donald E. Martin,
Hayward, Calif.

Application October 7, 1946, Serial No. 701,708

4 Claims. (Cl. 126—263)

This invention is directed to, and it is an object to provide, a chemically actuated heating device for canned foods; the device being initially separate but adapted to receive a can of food therein for the heating process.

Another object of the invention is to provide a device as in the preceding paragraph, which comprises a retaining can having the chemical as a layer in the bottom thereof, and a can guide and water passage forming assembly above said layer for the reception of the can of food to be heated and surrounded by the chemical; water poured into the retaining can at the top being conducted through said passages to the chemical to activate the same.

A further object of the invention is to provide a canned food heating device, of the type described, wherein the retaining can is initially sealed, by a removable lid, against accidental and undesirable moisture entry and resultant hydration of the chemical.

An additional object of the invention is to provide a canned food heating device which is especially useful to heat canned food at picnics, camps, or at home where other heating means may not be available or immediately convenient for use.

While primarily designed to heat foods, the device, with the use of a different chemical, may also be effectively used to chill foods or drinks when the same are in suitable containers.

A further object of the invention is to produce a practical canned food heating device, and one which will be exceedingly effective for the purpose for which it is designed.

These objects are accomplished by means of such structure and relative arrangement of parts as will fully appear by a perusal of the following specification and claims.

In the drawings:

Fig. 1 is a sectional elevation of the canned food heating device.

Fig. 2 is a plan view of the device with the top flange and lid removed.

Fig. 3 is a fragmentary perspective view showing one of the water passage forming, vertical spacers.

Referring now more particularly to the characters of reference on the drawings, the device comprises a metallic can 1 provided, in the bottom thereof, with a layer 2 of a chemical such as powdered lime; said layer of chemical being covered by a separator disc 3 in the can 1. This separator disc 3 is of absorbent heavy paper or cardboard.

Above the separator disc 3 the can 1 is provided with a close fitting lining sleeve 4 likewise of absorbent paper, such lining sleeve extending from the separator disc 3 upwardly to the top of the can 1.

A can locating sleeve 5, also of absorbent cardboard is disposed in the can 1 in co-axial but spaced relation to the lining sleeve 4, and the can locating sleeve 5 is of the same height as said lining sleeve 4.

The sleeves 4 and 5 are maintained in their co-axial spaced relation by a plurality of vertical spacers 6 of channel shape in cross section, which spacers are frictionally engaged between the sleeves 4 and 5 at circumferentially spaced points thereabout.

The spacers 6 are formed of absorbent cardboard and are perforated, as at 7, along the lines of bend.

The spacers 6 have the open side thereof bearing against the can locating sleeve 5, as clearly shown in Fig. 3, and said sleeve 5 is formed, downwardly from its upper edge and in communication with the spacers 6, with corresponding vertical slots 8. These slots 8 are of limited length, as shown. The annular space between sleeves 4 and 5, except where spacers 5 are located, is filled up to the slots 8 with the chemical 2, as shown in Fig. 2.

The can 1 is provided, at the top and about the peripheral portion thereof, with a top flange 9 which extends radially inwardly a sufficient distance to overhang the sleeves 4 and 5 and the spacers 6, whereby to engage the upper ends of the same and to maintain them frictionally in the can 1 in proper assembly and against displacement.

The top flange 9 defines an opening in which a removable lid 10 is initially inserted.

Before use of the above described device, the lid 10 prevents entry of moisture into the can 1, which would result in undesirable hydration of the chemical 2.

However, when the described device is used to heat canned food the lid 10 is first removed. Thereafter the can of food 11 to be heated is inserted into the device until it rests on the separator disc and is wholly disposed in the can locating sleeve 5, in the manner shown in dotted lines in Fig. 1. Thereafter, a quantity of water is poured into the can 1 on top of the can 11 and flows through the slots 8 and downwardly in the channels or water passages 12 formed by the spacers 6. From the passages 12 the water is absorbed by the separator disc 3 and gains immediate access to the chemical 2 surrounding sleeve 5, as well as to the bottom layer.

When this occurs the chemical is activated and immediately creates heat, generating steam which penetrates disc 3 and sleeve 5 to impart its heat to the can 11 and the contents of the latter.

As the sleeves 4 and 5, together with the spacers 6, are of absorbent cardboard, the same as the separator disc 3, adequate moisture is fed over a continuing period to the chemical 2, whereby the latter may be wholly activated, with resultant production of sufficient heat to satisfactorily heat the contents of the can 11. Full moisture dissemination throughout the can 1 is further facilitated by the perforations 7, which permit ready escape of water from the passages 12 laterally into the adjacent chemical, and thence by gravitation to the bottom layer of the chemical 2.

If desired, the lid 10 may be replaced on the can 1 during the heating period, whereby to prevent undue heat loss from the device.

If the device is to be used for chilling or semi-freezing purposes a suitable chemical, of a nature activated by the addition of water, is placed in the device instead of chemical 2.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A canned food heating device comprising a retaining can, a layer of chemical in the bottom of the retaining can, the chemical being of a type which creates heat upon hydration, a separator disc in the retaining can on top of said layer of chemical, and a food can guiding and locating assembly in the retaining can above the separator disc; said assembly including a lining sleeve in the retaining can, a food can guiding and locating sleeve disposed co-axially with and in inwardly spaced relation to the lining sleeve, and spacers between said sleeves, the separator disc, sleeves, and spacers being of water absorbent material and said spacers forming water passages between the top portion of the retaining can and the separator disc, the latter being of water absorbent material.

2. A canned food heating device comprising a retaining can, a layer of chemical in the bottom of the retaining can, the chemical being of a type which creates heat upon hydration, a separator disc in the retaining can on top of said layer of chemical, said separator disc being of absorbent material, a lining sleeve in the retaining can, a food can guiding and locating sleeve disposed in the lining sleeve co-axially therewith and in spaced relation thereto, the sleeves both extending between the disc and the top of the retaining can, a peripheral top flange on the retaining can bearing against the upper ends of the sleeves, and passage means to feed water from adjacent the top of the retaining can to the disc; said means comprising hollow upstanding spacers between the sleeves, the guiding and locating sleeve being slotted adjacent the top and the slots communicating with the interior of the spacers.

3. A device as in claim 2 in which the sleeves and spacers are of water absorbent material.

4. A heat transfer device for containers of food and the like comprising a vessel, a sleeve disposed co-axially with and spaced inwardly from the walls of the vessel and forming a receptacle to receive a container to be treated, spacers interposed between the walls of the vessel and said sleeve, such spacers being hollow, the sleeve being provided with slots in its upper edge opening into the hollow interior of the spacers, the spacers being perforated along their length, and a chemical filled into the vessel between the walls thereof and the sleeve and between the spacers, such chemical being of a nature to become activated upon hydration thereof.

VIRGIL E. C. MARTIN.
DONALD E. MARTIN.

REFERENCES CITED

The following references are of record in the file of this patent:

UNITED STATES PATENTS

| Number | Name | Date |
| --- | --- | --- |
| 794,848 | Bohm | July 18, 1905 |
| 862,151 | Friedman et al. | Aug. 6, 1907 |
| 929,842 | Eckart | Aug. 3, 1909 |
| 1,971,364 | Zimmer et al. | Aug. 28, 1934 |
| 2,185,799 | Blake et al. | Jan. 2, 1940 |
| 2,265,172 | Katz | Dec. 9, 1941 |
| 2,300,793 | Martin | Nov. 3, 1942 |
| 2,384,720 | Babcock et al. | Sept. 11, 1945 |

FOREIGN PATENTS

| Number | Country | Date |
| --- | --- | --- |
| 5,317 | Great Britain | 1878 |
| 407,332 | France | Dec. 27, 1909 |
| 476,797 | France | June 7, 1915 |